(12) United States Patent
Pellenc

(10) Patent No.: US 8,089,247 B2
(45) Date of Patent: Jan. 3, 2012

(54) POWER AUTONOMOUS PORTABLE ELECTRIC TOOL SET

(75) Inventor: Roger Pellenc, Pertuis (FR)

(73) Assignee: Pellenc (Société Anonyme, Pertuis (FR)

( * ) Notice: Subject to any disclaimer, the term of this patent is extended or adjusted under 35 U.S.C. 154(b) by 940 days.

(21) Appl. No.: 10/580,155

(22) PCT Filed: Nov. 19, 2004

(86) PCT No.: PCT/FR2004/002954
§ 371 (c)(1),
(2), (4) Date: May 19, 2006

(87) PCT Pub. No.: WO2005/053131
PCT Pub. Date: Jun. 9, 2005

(65) Prior Publication Data
US 2007/0108944 A1      May 17, 2007

(30) Foreign Application Priority Data
Nov. 20, 2003   (FR) ...................... 03 13608

(51) Int. Cl.
*H02J 7/00*   (2006.01)
(52) U.S. Cl. ...................................... 320/112
(58) Field of Classification Search ............ 320/112
See application file for complete search history.

(56) References Cited

U.S. PATENT DOCUMENTS

| | | | | |
|---|---|---|---|---|
| 5,466,545 A * | 11/1995 | Chamberlain et al. | ........... | 429/99 |
| 5,808,469 A * | 9/1998 | Kopera | ........................ | 324/434 |
| 6,087,815 A * | 7/2000 | Pfeifer et al. | ................. | 323/282 |
| 6,218,806 B1 * | 4/2001 | Brotto et al. | .................. | 320/106 |
| 6,229,280 B1 * | 5/2001 | Sakoh et al. | .................. | 320/114 |
| 6,268,710 B1 * | 7/2001 | Koga | ............................ | 320/116 |
| 6,285,161 B1 * | 9/2001 | Popescu | ........................ | 320/118 |
| 6,433,517 B2 * | 8/2002 | Sakakibara | ................... | 320/153 |
| 6,577,105 B1 * | 6/2003 | Iwaizono | ..................... | 320/134 |
| 7,227,335 B2 * | 6/2007 | Sakakibara et al. | .......... | 320/132 |
| 7,592,773 B2 * | 9/2009 | Pellenc | ......................... | 320/112 |

(Continued)

FOREIGN PATENT DOCUMENTS

EP      0291131      11/1988

(Continued)

OTHER PUBLICATIONS

Canadian Office Action with partial English-language translation.

*Primary Examiner* — Jue Zhang
(74) *Attorney, Agent, or Firm* — Greenblum & Bernstein, P.L.C.

(57) ABSTRACT

A power autonomous portable electric tool set includes a first sub-unit generating a mechanical operation of a tool having an electric actuator, a portable second sub-unit forming an electric energy source of the set including a battery and at least one electric or electronic module located in a vicinity of the battery for at least one of controlling and managing the battery, a third charger sub-unit for electrically recharging the battery, including at least one electric supply source, wherein the third charger sub-unit adapts a voltage and a current of the at least one electric supply source to recharge the battery, and a cutoff device structured and arranged to cutoff an electric supply of the electric actuator. Additionally, the power autonomous portable electric tool set includes the first sub-unit electrically disconnectably connectable to the second sub-unit and the third sub-unit electrically disconnectably connectable to the second sub-unit.

60 Claims, 12 Drawing Sheets

| U.S. PATENT DOCUMENTS | | | |
|---|---|---|---|
| 2001/0052758 A1 | 12/2001 | Odaohhara | |
| 2002/0079867 A1 | 6/2002 | Sakakibara et al. | |
| 2003/0096158 A1* | 5/2003 | Takano et al. | 429/90 |
| 2004/0027094 A1* | 2/2004 | Sanders et al. | 320/150 |
| 2005/0077878 A1* | 4/2005 | Carrier et al. | 320/134 |

| FOREIGN PATENT DOCUMENTS | | |
|---|---|---|
| EP | 0310717 | 4/1989 |
| EP | 1217710 | 6/2002 |
| FR | 2862813 | 11/2003 |

* cited by examiner

POWER AUTONOMOUS PORTABLE ELECTRIC TOOL SET

CROSS REFERENCE TO RELATED APPLICATIONS

The present application is a U.S. National Stage Application of International Application No. PCT/FR2004/002954 filed Nov. 19, 2004, which published as WO 2005/053131 A2 Jun. 9, 2005, the disclosure of which is expressly incorporated by reference herein in its entirety. Further, the present application claims priority under 35 U.S.C. §119 and §365 of French Application No. 0313608 filed Nov. 20, 2003.

BACKGROUND OF THE INVENTION

1. Field of the Invention

The present invention relates to the field of self-powered apparatuses and tools, more particularly power autonomous portable electric tools, and relates to a lithium-ion or polymer lithium battery-operated tool set of the aforementioned type.

2. Description of Background Information

In the present invention, "tool" is generally defined as an apparatus or implement adapted to facilitate the physical work of an operator performing a task, or to perform said task while controlled by an operator. By "tool set" is meant a tool and its autonomous rechargeable electric energy source, and the device for supplying the latter.

The following tools, which have already been manufactured by the Applicant, can be cited: electronic pruning scissors for cutting fruit trees and vineyards, vegetable grafters and fruit picking tools.

Other tools, manufactured using similar techniques, can be cited in a non-limiting manner among tools of the aforementioned type, including: saws, lawnmowers, bush cutters, hedge cutters, impact spanners, pneumatic hammers.

These power portable electric tool sets essentially distinguish over comparable tools that are actuated by hydraulic, pneumatic, and electric power sources in that they are self-contained and independent of any external power source, which enables the operator to move freely. They also distinguish over self-contained heat engine-powered portable tools, by the lack of pollution, foul odors, vibrations and noise during use, as well as by their reliability of use.

Furthermore, it has been shown that the use of these tool sets provides an unprecedented comfort of use, due to their silent operation and their flexibility.

Such power autonomous portable electric tool sets generally include at least three distinct functional sub-units, namely, a first sub-unit forming an electric actuator and generating the mechanical operation of the tool, a second sub-unit forming an electric energy source and essentially including a rechargeable electrochemical battery, and a third sub-unit forming a charger capable of recharging the battery.

The advent and development of these tool sets are mainly linked to two technical factors:

the commercial availability of new types of batteries having a better capacity to weight ratio, on the one hand; and the development of technologies producing high performance electric motors.

The batteries that are currently used in the aforementioned tool sets are of the nickel-cadmium type, or of the nickel-metal hydride type. They have an energy capacity of about 30-50 watt-hour per kilogram.

Knowing that an operator is allowed to carry a maximum of 4 kg on his back, across his shoulder, or on his belt for work sustained throughout the day, in compliance with official guidelines, one can infer that with the current techniques using nickel-cadmium and nickel-metal hydride, the total capacity of the battery carried by the operator is between 120 and 200 watt-hours.

This capacity is not always sufficient to provide the power autonomous portable electric tool sets with the energy required to operate half day, let alone a full day.

Therefore, there is a need and an actual demand for batteries having a more efficient capacity to weight ratio, in order to expand the field of application of the power autonomous portable electric tool sets, in view of their aforementioned advantages and qualities.

To this end, the invention aims at using the emerging technology of lithium-ion and lithium polymer batteries in the context of power autonomous portable electric tools.

Indeed, although these batteries are now frequently used in mobile telephones, video cameras, and portable computers, they are not yet used in applications to portable electric tools, especially professional grade tools, due to difficulties encountered with their implementation in application requiring a lot of power and autonomy. However, they currently offer capacity to weight ratios of 150-220 watt-hours per kilo, which would triple, or even quadruple the power or operating time of these portable electric tools, compared to their current capabilities when used with nickel cadmium or nickel metal hydride batteries.

It should be noted that due to the power requirements, the use of lithium-ion and lithium polymer batteries in power portable electric tools requires high voltages.

Indeed, the lithium-ion and lithium polymer elements cannot naturally deliver too high a current and therefore require the base elements to be serially coupled so as to obtain high voltages, thereby making it possible to supply adequate voltages, in spite of a limited current.

Thus, to form batteries that deliver electric power adapted to applications to power autonomous portable electric tools, while complying with the laws in force governing serviceable voltages and providing useful working voltages, it is necessary to serially couple numerous elements or numerous cells, each of these cells grouping such elements in parallel.

By "element" is meant an individual electric energy accumulator. The lithium-ion or lithium polymer base elements are industrially manufactured according to standardized formats adapted to the applications. They are produced in bulk, at very competitive costs. Advantageously, but in a non-limiting manner, the elements of the lithium-ion battery of the second sub-unit described hereinafter are in the commercial 18650 size that offers the best capacity to cost ratio. As a general rule, these elements are equipped with internal safety mechanisms which enable high capacity batteries to be used safely.

As a result, there are substantial difficulties in controlling and/or managing such multi-component batteries, which have yet to be resolved.

Indeed, in the aforementioned applications (mobile telephones, video cameras, and portable computers), the batteries generally comprise at the most four serially associated elements or cells, the control of which, when charging and discharging, is not complex and is relatively easy to implement.

SUMMARY OF THE INVENTION

The aim of the present invention is to find a solution to the aforementioned problem.

According to the invention, a power autonomous portable electric tool set of the aforementioned type, i.e., which comprises at least the three functional sub-units mentioned previously, said tool set being characterized in that the first sub-unit is connected to the second sub-unit, at least during use of the tool, by a flexible electric cord, on the one hand, and in that the power supply of the actuator that constitutes it can be cutoff automatically and/or at will by the operator, on the other hand. The second sub-unit is portable and comprises a lithium-ion or lithium polymer battery formed by association of a series of cells, each cell comprising one element or a plurality of parallel elements, on the one hand, and one or a plurality of electric or electronic modules for controlling and/or managing the battery, these modules being located in the vicinity of said battery. The third charger sub-unit comprises at least one electric power supply, the voltage and current of which are adapted to recharging the lithium-ion or lithium polymer battery. This third sub-unit is electrically connected to the second sub-unit by a disconnectable flexible cord.

For the purpose of describing the claimed invention, it is noted that "module" is defined as a functional electric, electromechanic or electronic unit participating in the functions of the second sub-unit.

BRIEF DESCRIPTION OF THE DRAWINGS

The present invention will be better understood from the following description, which relates to several preferred embodiments, provided by way of non-limiting examples and explained with reference to the annexed schematic drawings, in which.

DETAILED DESCRIPTION OF THE INVENTION

Figure 1:
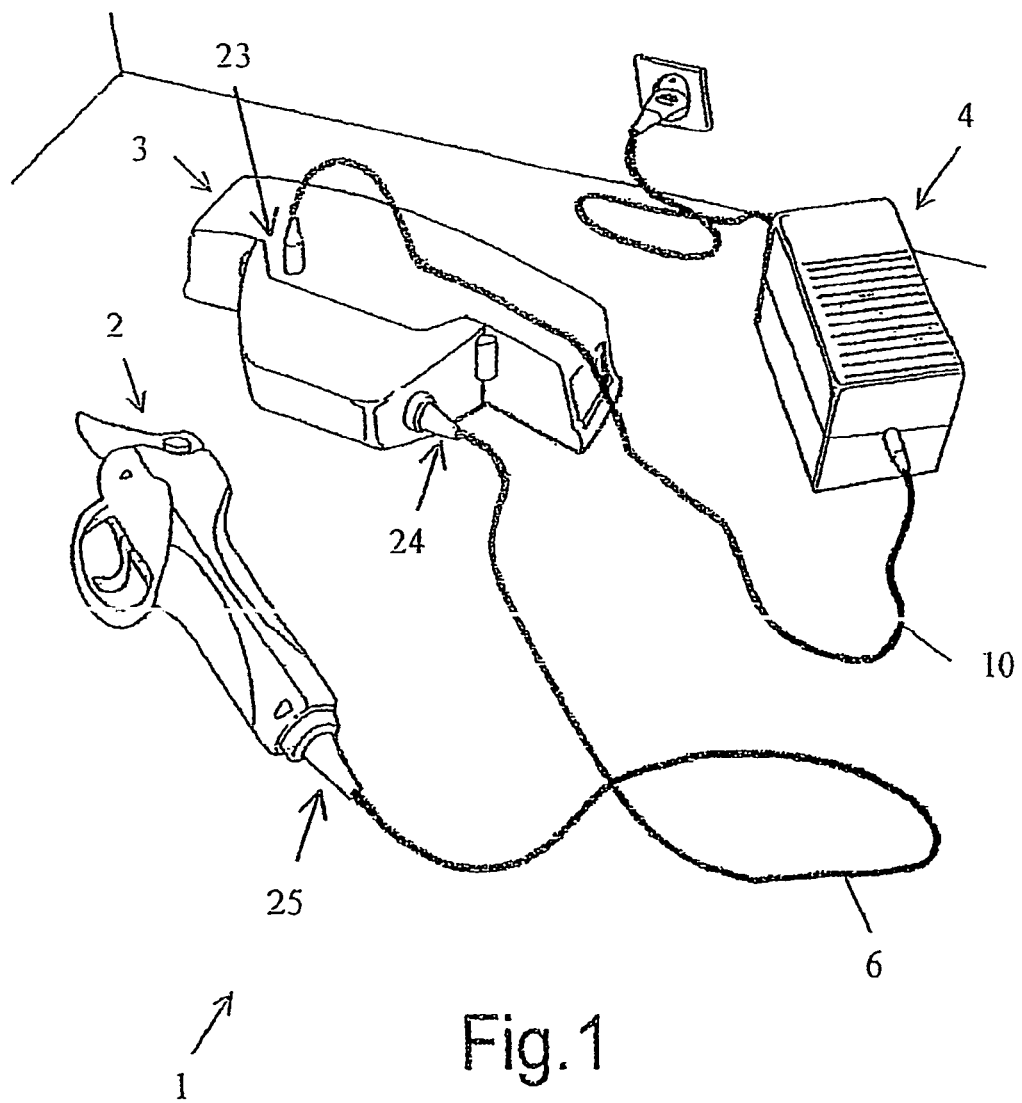
FIG. 1 is a perspective view of a tool set according to the invention, in the form of pruning scissors, during a charging phase.
Figure 2:
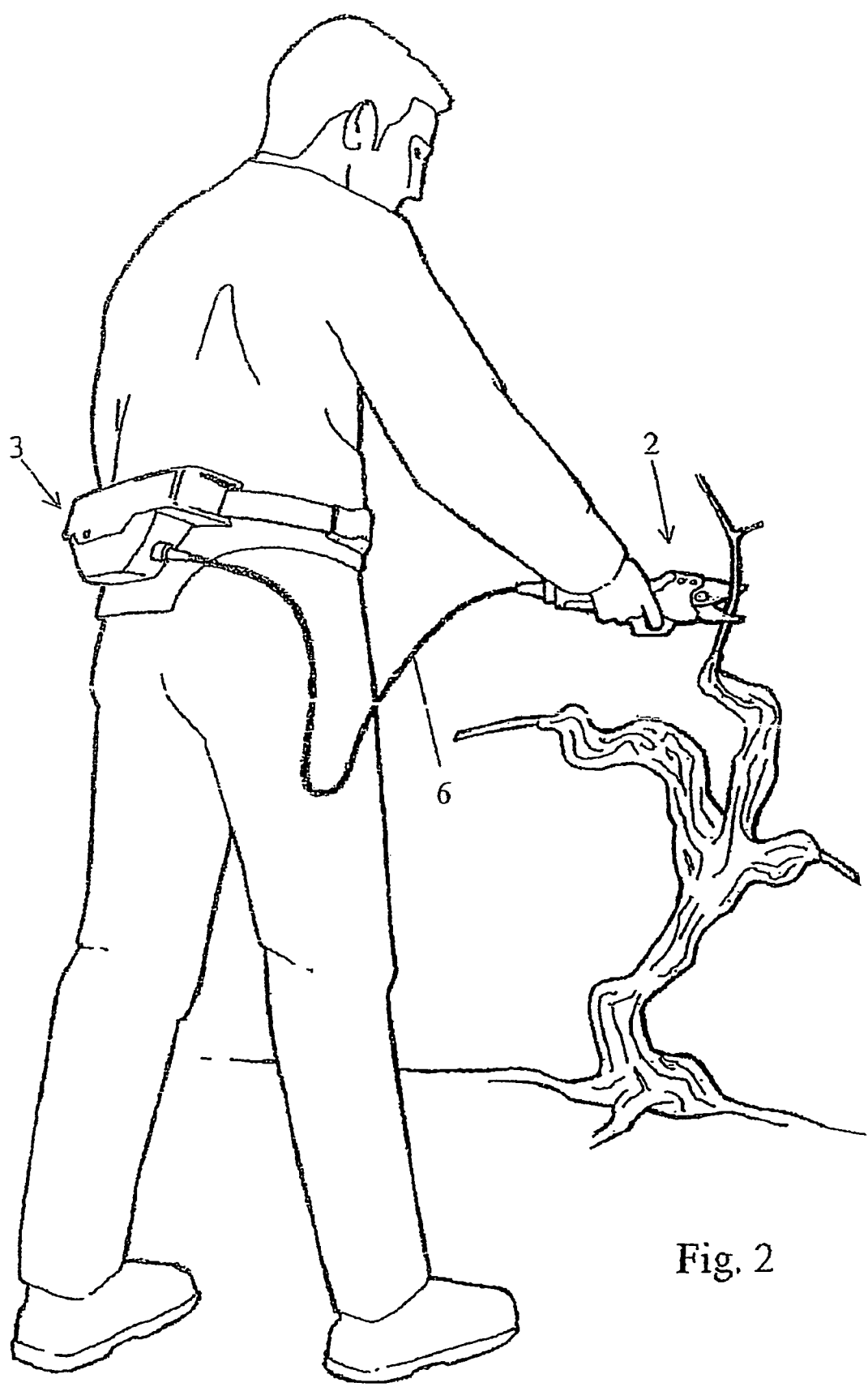
FIG. 2 is a perspective view of the tool set of FIG. 1, during use by an operator.

As shown in FIGS. 1 and 2, the power autonomous portable electric tool set 1 includes at least three distinct functional sub-units 2, 3, and 4, namely, a first sub-unit 2 forming an electric actuator and generating the mechanical operation of the tool, a second sub-unit 3 forming the electric energy source and essentially including a rechargeable lithium-ion or lithium polymer battery 5, and a third sub-unit 4 forming a charger capable of recharging the battery 5.

Figure 3:
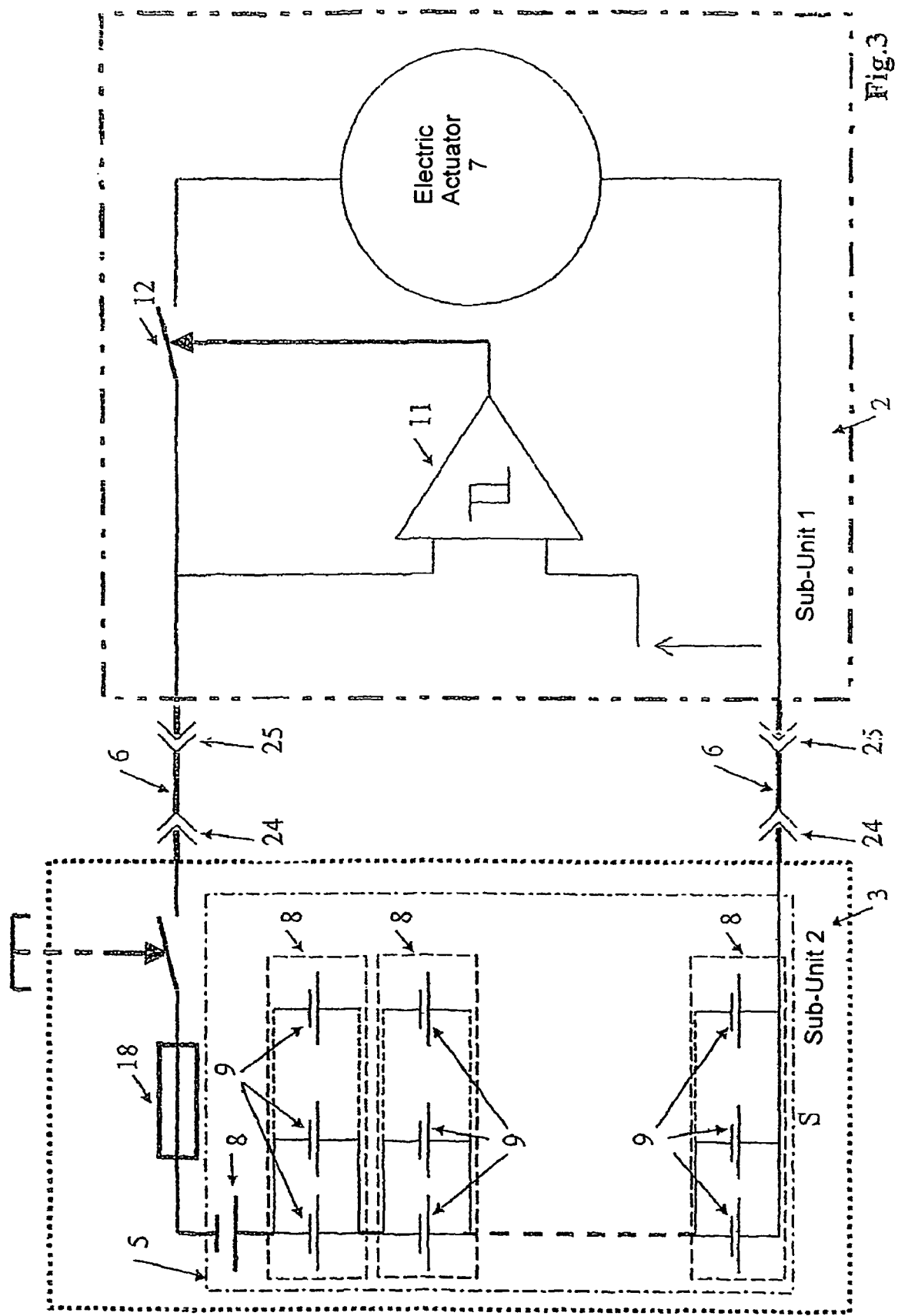
FIG. 3 is a synoptic diagram of a non-limiting embodiment of the tool in which the first sub-unit is equipped with a device for the automatic cutoff, at minimum low voltage, of its electric supply coming from the second sub-unit to which it is connected during use of the tool.

According to the invention, the first sub-unit 2 is connected to the second sub-unit 3, at least during use of the tool, by a flexible electric cord 6, on the one hand, and it is provided with a cutoff mechanism that makes it possible to disconnect the electric supply of the actuator 7, as shown in FIG. 3, which constitutes it, automatically and/or at will by the operator, on the other hand.

The electric actuator 7 of the first sub-unit 2 can be constituted, for example, by a direct current brush electric motor, or by a tri-phase synchronous brushless electric motor, with position sensors, or by a tri-phase synchronous brushless electric motor without position sensors.

As shown in FIG. 2, the second sub-unit 3 can be carried by the operator, and, as shown in FIG. 3, it is constituted by a lithium-ion or lithium polymer electrochemical battery 5 formed by serially associating cells 8, each cell comprising one element or a plurality of elements 9 associated in parallel, on the one hand, and one or a plurality of electric or electronic modules for controlling and/or managing the battery, these modules being located in the vicinity of said battery, on the other hand. For example, they are fixed on the support of the battery and within the casing enclosing the second sub-unit 3. The electric or electrical modules can also be incorporated directly into the casing of the second sub-unit 3, for example, by wedging.

By positioning the module(s) in the immediate proximity of the battery 5, the connections and wiring are made easier and less fragile, and the measuring and control signals are less exposed to disturbances, losses or interferences and less subject to drifts, due to a reduced transmission distance.

According to advantageous embodiments of the invention:
one module among the electric or electronic module(s) for controlling and/or managing the battery equipping the second sub-unit 3 is configured for the function of automatically cutting off the electric supply of the first sub-unit 2 when the battery voltage has reached a minimum low level prior to the deterioration, by significant loss of capacity and increase of spontaneous discharge, of the lithium-ion or lithium polymer battery 5 equipping the second sub-unit 3;

one module among the electric or electronic module(s) for controlling and/or managing the battery 5 equipping the second sub-unit 3 is configured for the function of automatically cutting off the electric charging of the battery 5 when the voltage delivered by the third charger sub-unit 4, to which it is connected, has reached the maximum value prior to the deterioration, by significant loss of capacity and increase of spontaneous discharge, of the lithium-ion or lithium polymer battery 5 equipping the second sub-unit 3;

one module among the electric or electronic module(s) for controlling and/or managing the battery 5 equipping the second sub-unit 3 is configured to carry out the function of automatically cutting off the electric charging of the battery 5 when the current charging the battery 5 has reached a minimum low level recommended or required by the manufacture of the lithium-ion or lithium polymer battery 5 equipping the second sub-unit 3; and one module among the electric or electronic module(s) for controlling and/or managing the battery 5 equipping the second sub-unit 3 is configured to carry out the function of protecting the battery 5 against short circuits.

The third charger sub-unit 4 comprises at least one electric energy source, in which the voltage and current are adapted to recharging the lithium-ion or lithium polymer battery 5. This third charger sub-unit 4 is electrically connected to the second 3 sub-unit by a disconnectable flexible cord 10.

The second and third sub-units 3 and 4 can be in the form of a single unit integrating the two sub-units 3 and 4, or in the form of two distinct physical entities that are electrically connected to one another by a disconnectable flexible cord during the charging phases. This latter alternative embodiment is naturally preferred in the context of the present application for reducing the load to be carried by the operator.

The electric flexible cord 6 that connects the first sub-unit 2 to the second sub-unit 3 can be provided with:
  a connector 24 couplable to the second sub-unit 3;
  a connector 25 couplable to the first sub-unit 2; or
  a connector 25 couplable to the first sub-unit 2 and also a second connector 24 couplable to the second sub-unit 3.

According to a first non-limiting embodiment of the invention (FIG. 3), the first sub-unit 2 is equipped with a device for the automatic cutoff, at minimum low voltage, of its electric supply coming from the second sub-unit 3 to which it is connected during use of the tool. It should be noted that lithium-ion or lithium polymer batteries should never be completely discharged; a mere discharge below the minimum voltage value recommended by the manufacturer leads irremediably to the deterioration of the battery. Therefore, it is necessary to equip the tool set with a device limiting the discharge voltage to remedy this drawback. The precision of this minimum discharge voltage limitation should be on the order of 10%. It is obtained by an electronic system based on a voltage comparator 11, preferably with hysteresis, that compares the voltage of the battery 5 to a reference voltage, which is determined by the multiplication of minimum discharge voltage of an element recommended by the manufacturers of lithium-ion or lithium polymer battery elements by the number of battery cells in a series. This system thus enables the cutoff of the electric supply of the first sub-unit 2 by acting directly on a cutoff member, for example, a MOS transistor or a relay 12. This device 12 can be located directly on the first sub-unit 2, which is the case for this first embodiment, but also on the second sub-unit 3, which corresponds to the next example of embodiment.

Figure 4:
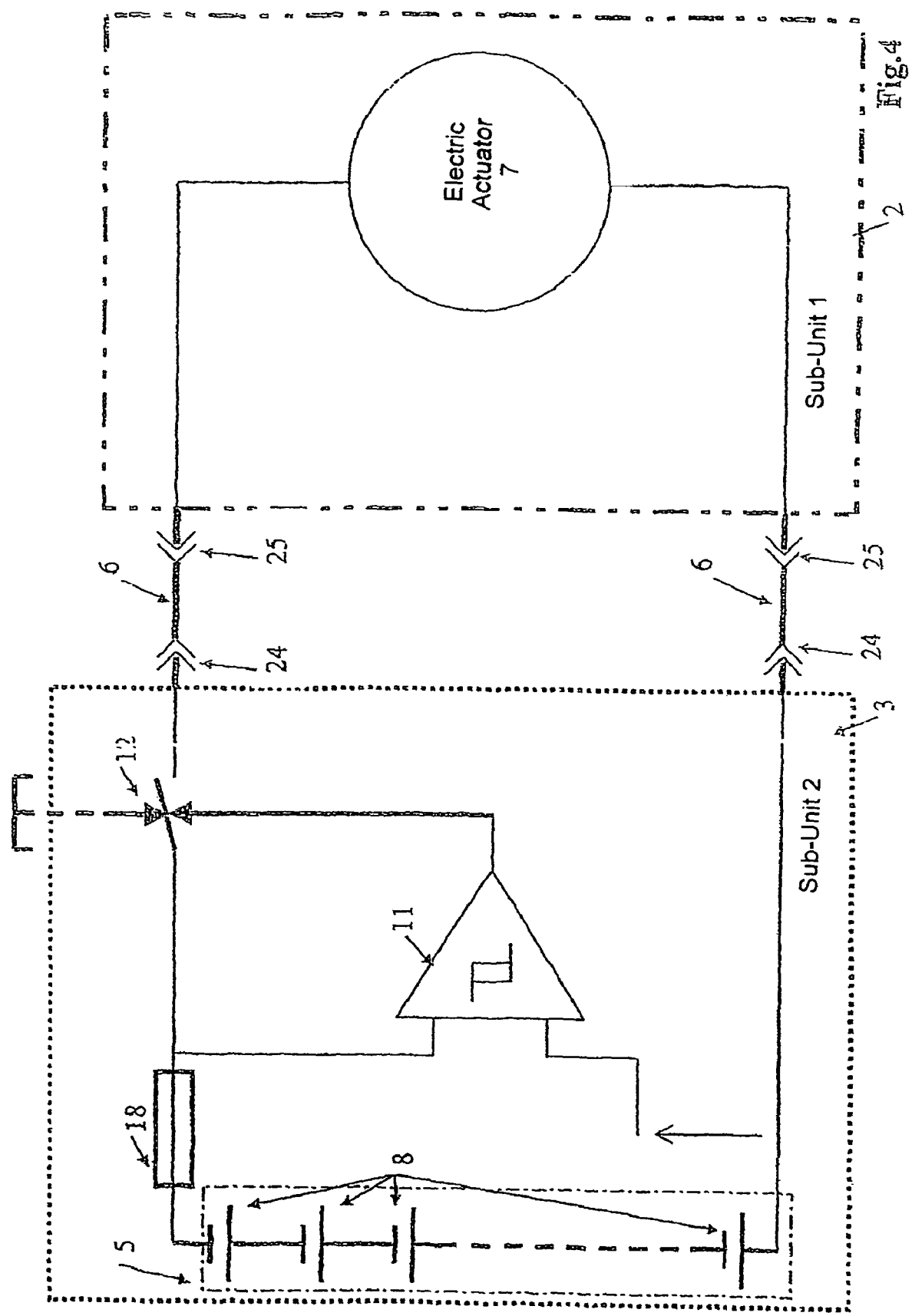
FIG. 4 is a synoptic diagram of a non-limiting embodiment of the tool in which the second sub-unit is equipped with a module for the automatic cutoff, at minimum low voltage, of the electric supply of the first sub-unit to which it is connected during use of the tool.

According to a second embodiment (FIG. 4), the battery discharge voltage limitation is obtained during use of the tool by one of the electric or electronic modules for controlling and/or managing the battery 5 of the second sub-unit 3 to which it is connected by the flexible cord 6 during use of the tool. The embodiment is identical to that described hereinabove, the difference being that the electronic cutoff system is located on the second sub-unit 3.

Figure 5:
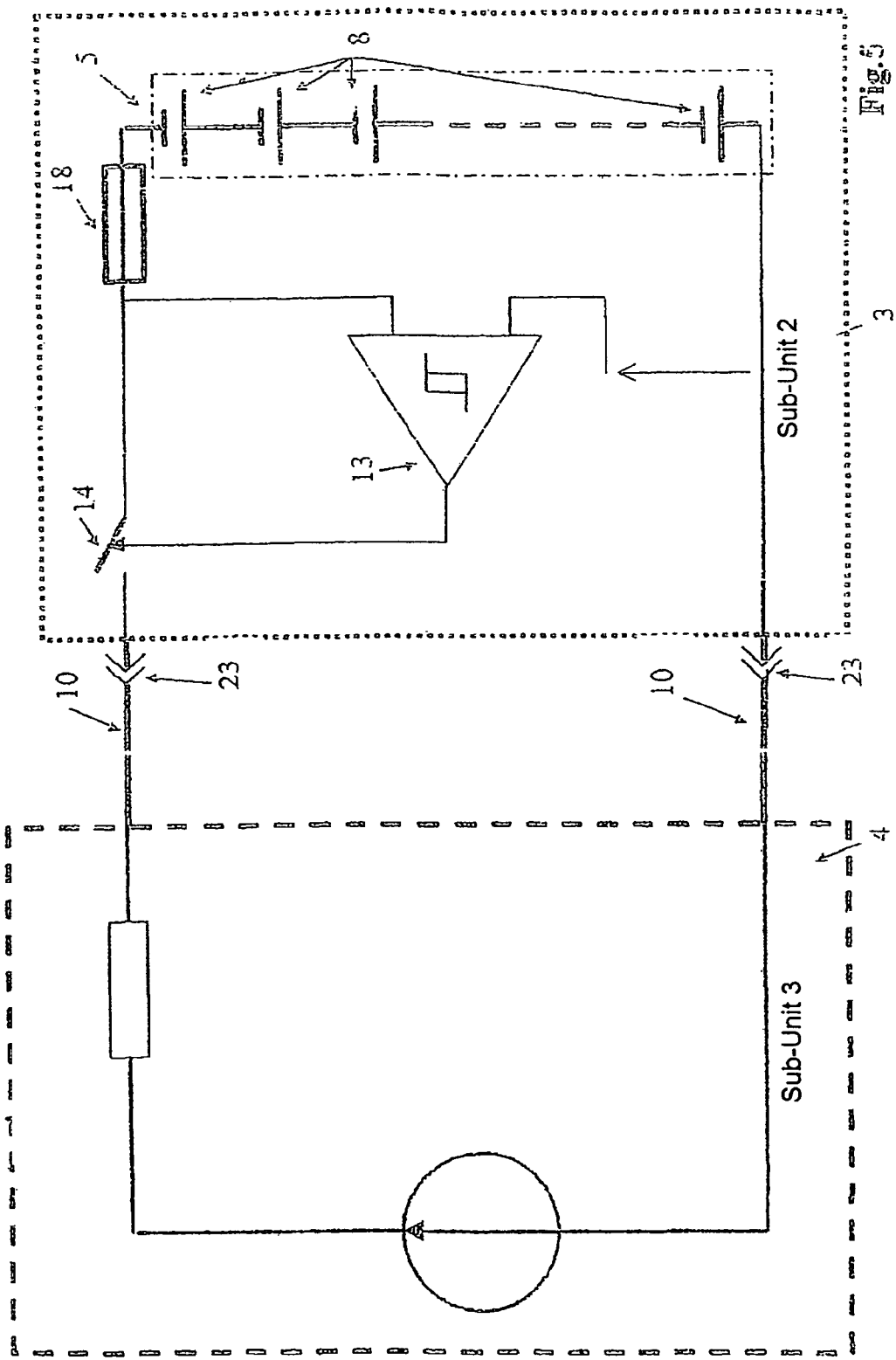
FIG. 5 is a synoptic diagram of a non-limiting embodiment of the tool, in which the second sub-unit is equipped with a module for the automatic cutoff of the charging at maximum high voltage of its electric supply, the latter being connected to the third charging sub-unit.

According to a third embodiment (FIG. 5), the second sub-unit 3 is equipped with a module for the automatic cutoff of the charging, at maximum high voltage, of its electric supply, the latter being connected to the third charger sub-unit 4. It should be noted that lithium-ion or lithium polymer batteries should never be charged beyond a maximum voltage recommended or required by the manufacturer of the lithium-ion or lithium polymer battery used, as exceeding this charge voltage would irremediably lead to the deterioration of the battery elements. Therefore, it is necessary to equip the tool set 1 with a charge voltage limiting device in order to remedy this drawback. This maximum charge voltage limitation must be very precisely set to at least 1%; it is obtained by an electronic system constituted by a voltage comparator 13, preferably with hysteresis, that compares the battery voltage to a reference voltage, which is determined by the multiplication of the maximum charge voltage of an element as recommended by the manufacturer of the elements of the lithium-ion or lithium polymer battery that is used by the number of serially associated cells of the battery 5. This system thus enables the cutoff of the electric supply of the charging of the second sub-unit by acting directly on a cutoff member, for example, a MOS transistor or a relay 14. This embodiment requires an off-load voltage of the third charger sub-unit 4 that is greater than the reference voltage. This device can be located directly on the second sub-unit 3, which is the case in this embodiment, but can also be mounted directly on the third charger sub-unit 4, as explained hereinafter.

Figure 6:
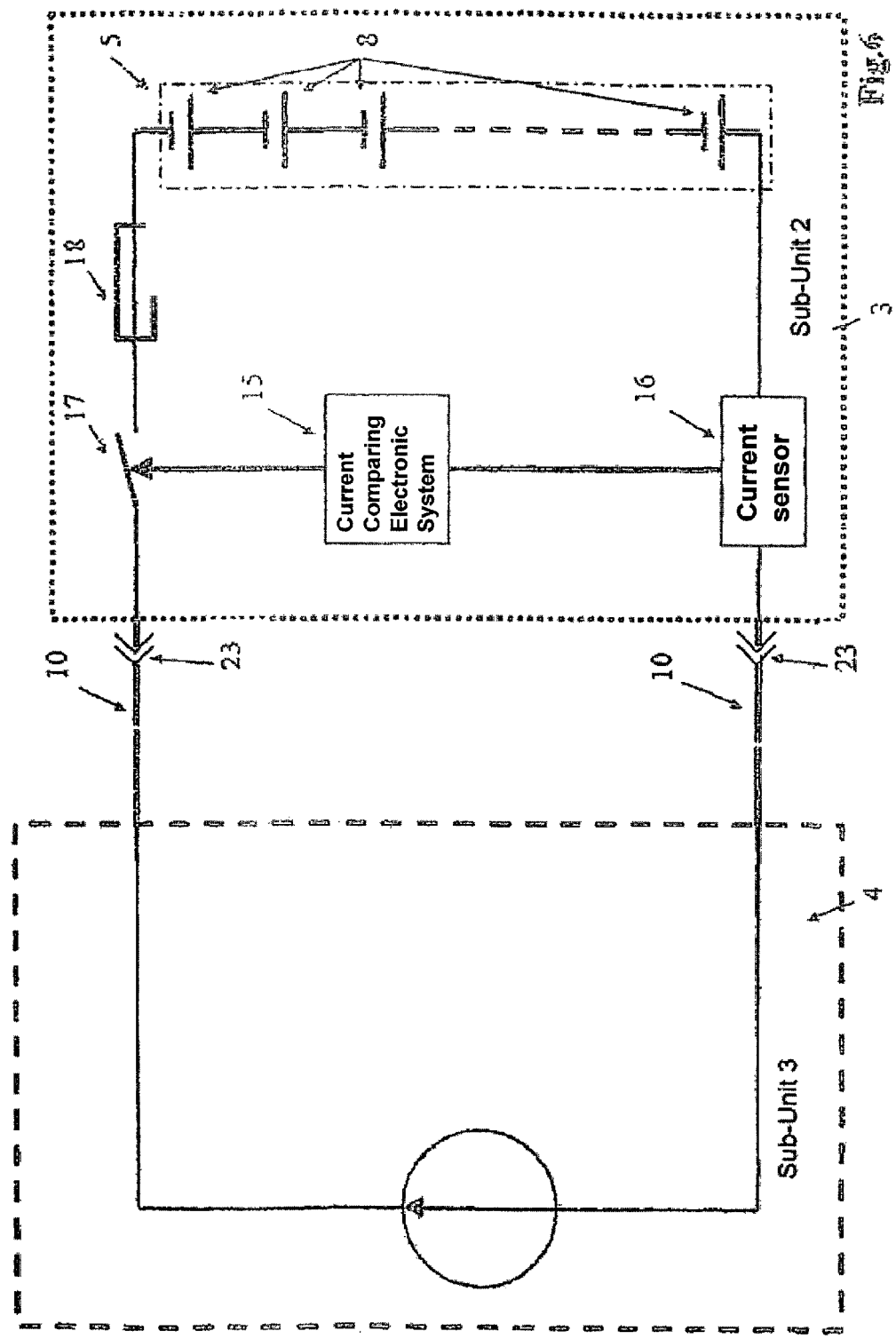
FIG. 6 is a synoptic diagram of a non-limiting embodiment of the tool, in which the second sub-unit is equipped with a module for the automatic cutoff of the charging at low current of its electric supply, the latter being connected to the third charging sub-unit.

According to a fourth embodiment (FIG. 6), the second sub-unit 3 is equipped with a module for the automatic cutoff of its electric supply at minimum charge current, the latter being connected to the third charger sub-unit 4. It should be reminded that the manufacturers of lithium-ion or lithium polymer battery elements recommend stopping the charging at a minimum current value, which prevents plating of the metallic lithium and the element from becoming unstable and dangerous, and thereby causing its deterioration. Consequently, it is necessary to equip the tool set 1 with a device for limiting the charging at minimum current. This limitation at minimum charge current is obtained by a current comparing electronic system 15 constituted by a current comparator, preferably with memory, that compares, via a shunt or a current sensor 16, the battery charging current to a reference current, which is determined by the multiplication of the end of charging current recommended by the manufacturer of the lithium-ion or lithium polymer battery elements used by the number of associated parallel elements constituting the cells of the battery 5. This system thus enables the cutoff of the electric supply of the charging of the second sub-unit 3 by acting directly on a cutoff member, for example, a MOS transistor or a relay 17. To carry out this function, this module can be located directly on the second sub-unit 3, which is the case in this embodiment, but can also be directly mounted on the third charger sub-unit 4, as explained in another embodiment disclosed hereinafter.

Figure 7:
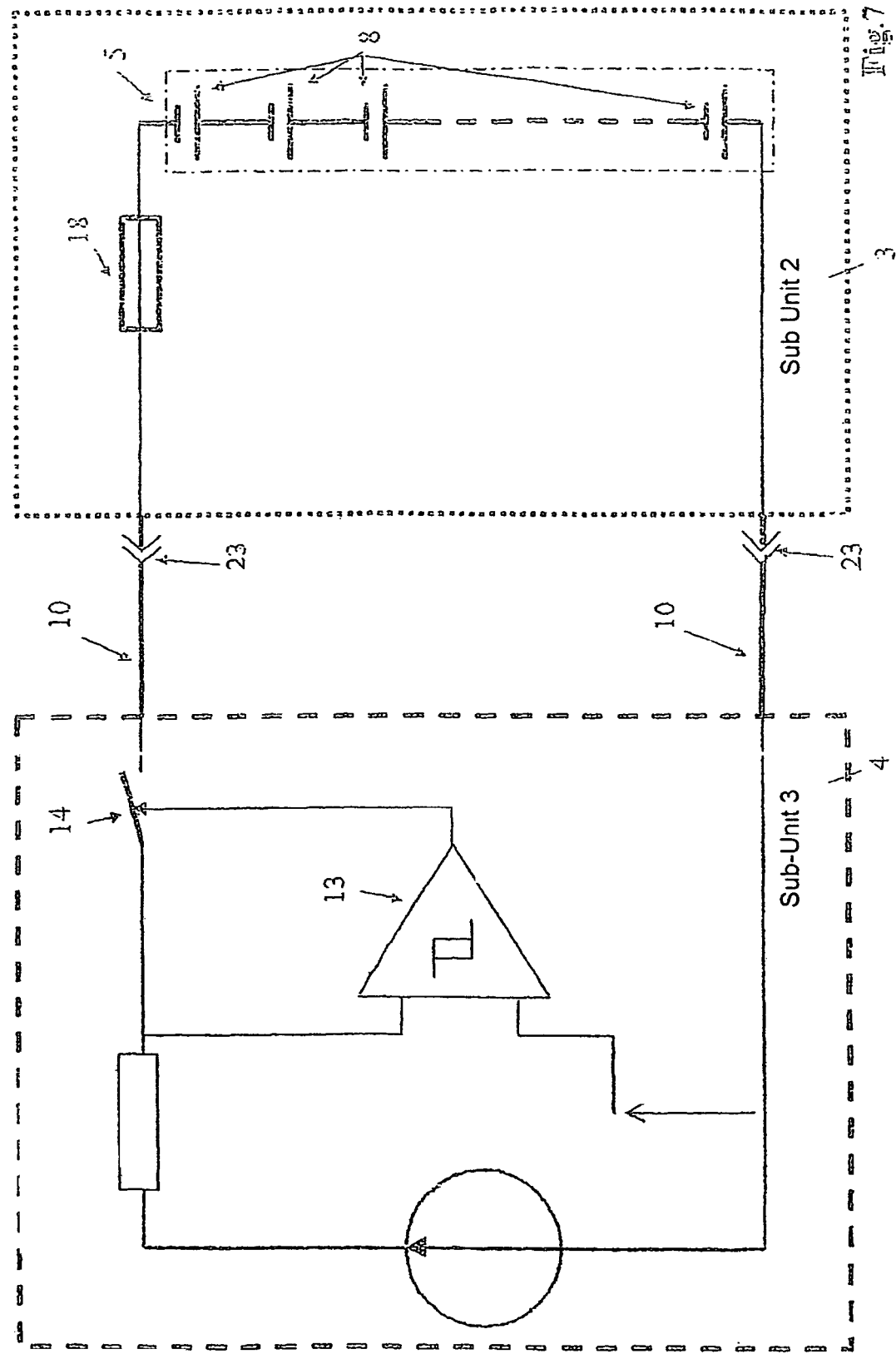
FIG. 7 is a synoptic diagram of a non-limiting embodiment of the tool, in which the third charger sub-unit is equipped with a device for the automatic cutoff of the charging at maximum high voltage of the electric supply of the second sub-unit.

According to a fifth embodiment (FIG. 7), it is the third charger sub-unit 4 that implements the limitation at maximum charge voltage by cutting off the electric supply of the second sub-unit 3 to which it is connected during the charging operation. This embodiment is identical to that described hereinabove, the difference being that the electronic cutoff system is located on the third charger sub-unit 4.

Figure 8:
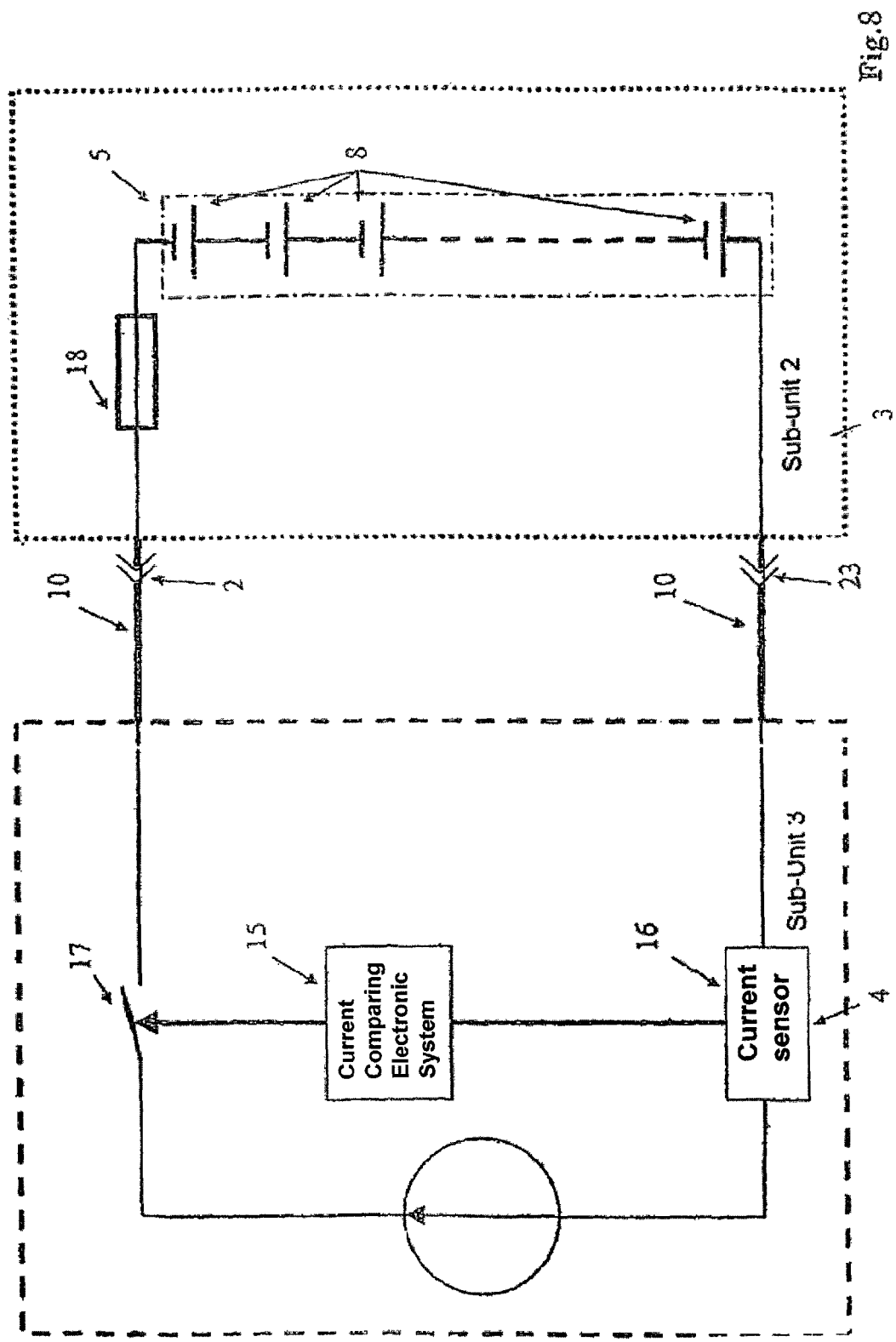
FIG. 8 is a synoptic diagram of a non-limiting embodiment of the tool, in which the third charger sub-unit is equipped with a device for the automatic cutoff of the charging at minimum low current of the electric supply of the second sub-unit.

According to a sixth embodiment (FIG. 8), it is the third charger sub-unit 4 that implements the limitation at minimum charging current by cutting off the electric supply of the second sub-unit 3 to which it is connected during the charging operation. This embodiment is identical to that described hereinabove, the difference being that the electronic cutoff system is located on the third charger sub-unit 4.

These two last embodiments are integrated into the third charger sub-unit 4 that transforms the alternating electric energy of the network into direct, pulsating or rectified voltage and current, adapted to recharging the lithium-ion or lithium polymer battery 5, when the third charger sub-unit 4 is electrically connected to the second sub-unit 3 by a flexible cord 10. The third charger sub-unit 4 is electrically connected by a disconnectable flexible cord 10 to the second sub-unit 3, for example, by a connector 23.

Figure 9:
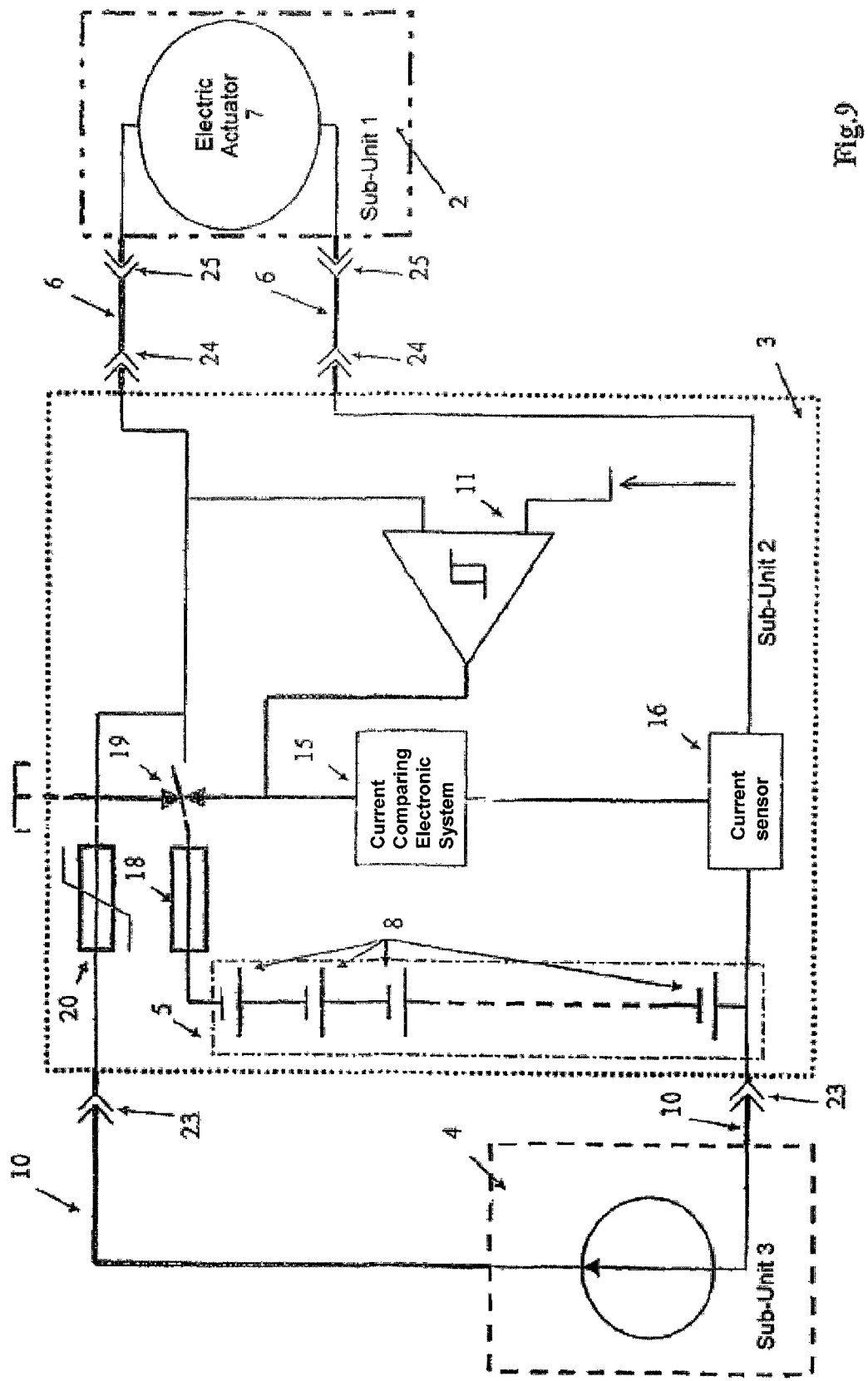
FIG. 9 is a synoptic diagram of a non-limiting embodiment of the tool, in which the second sub-unit is equipped with one or several modules capable of carrying out the following functions: a) the cutoff at minimum low voltage of the electric supply of the first sub-unit, when the first sub-unit is used by the operator; b) the automatic cutoff of the charging at maximum high voltage and, c) the automatic cutoff of the charging at minimum low current when the second sub-unit is connected to the third sub-unit during the charging operation; d) protection against short circuits; e) placing the battery in no consumption or very little consumption mode when the first sub-unit is not in use; 1) stopping the charging at excessive temperature.

To make an operational and reliable tool set, according to a seventh embodiment (FIG. 9), some of the six previously described embodiments will be allowed to cohabit, in order to obtain the control and/or management of the battery 5 in limiting the discharge voltage and in limiting of charge voltage and current. Concurrently with these limitations, it will be necessary to provide protection against the battery short circuits that could cause ill-timed heating and cause the battery 5 to catch fire. This protection against short circuits can be usefully obtained by a fuse or a circuit breaker 18, or a similar component, mounted on at least one terminal of the battery 5, preferably prior to any other connection. Furthermore, it is very important that the battery 5 be placed in no consumption or very little consumption mode, in order to prevent the battery voltage from dropping below the minimum voltage beyond which the battery 5 would deteriorate. This function can be carried out in a non-limiting manner by a switch 19 arranged at one of the terminals of the battery 5, and preferably after the fuse or the breaker 18, if the latter are installed. The manufacturers of lithium-ion or lithium polymer battery elements also recommend that, during charging and discharging, the battery 5 be protected against usage and recharging outside of certain temperature ranges. The temperature range recommended for use during discharging is between −15° C. and +60° C., and between 0° C. and 45° C. for charging. The risks of exceeding the thresholds are especially sensitive during charging and less sensitive during discharging. It is therefore necessary to protect the battery 5 to a minimum during charging. To carry out this function, one could, in a non-limiting manner, insert a temperature sensor 20 capable of electrically isolating the lithium-ion or lithium polymer battery 5 on a terminal of the battery, in the vicinity of the fuse or the breaker 18. It must be noted that the limitation at minimum charging current can be replaced by a system limiting the charging duration in time, as a function of the capacity of the elements, of the number of associated parallel elements in a cell of the battery 5 and of the maximum current delivered by the third charger sub-unit 4.

According to an eighth, non-limiting and extremely efficient embodiment (FIGS. 10, 11, 12) of the invention that has enabled the applicant to very safely obtain a cycle life of more than 1000 charging and discharging cycles, with a loss of capacity of less than 20%, over several years of testing; knowing that lithium-ion batteries are known for their risk of catching fire in view of their organic electrolyte and the very flammable lithium. In this embodiment, the second sub-unit 3 is equipped with a single control module 26 for controlling and/or managing the battery 5 in the form of at least one electronic board including at least one digital processing unit 21, such as, for example, a microprocessor, a microcontroller, a digital signal processor, associated with a memory and with annexed digital and/or analog circuits capable, together, of performing some, and preferably all of the following tasks:

managing the charging;
managing the discharging;
balancing the charging of each cell 8;
evaluating and displaying the capacity of the battery 5;
protecting the battery 5 when discharging against excess current when the tool is being used;
managing the tool during the storing phases;
managing the alarms;
managing and transmitting the information collected; and
managing the diagnostics.

Performing these various tasks is initiated and directed by the digital processing unit 21, under the control of a program managing the functioning of the tool set 1, while taking into account the user's commands and the values of various parameters measured in the area of the second sub-unit 3, and possibly in the area of the first and/or third sub-unit(s) 2 and/or 4.

According to one or several characteristics of the invention, and in view of completing the tasks of managing the charging, managing the discharging, balancing the charging of each cell 8, evaluating and displaying the capacity of the battery 5, the control module 26 constantly exploits the voltage measuring values for each cell 8 composing the battery 5.

Figure 10:
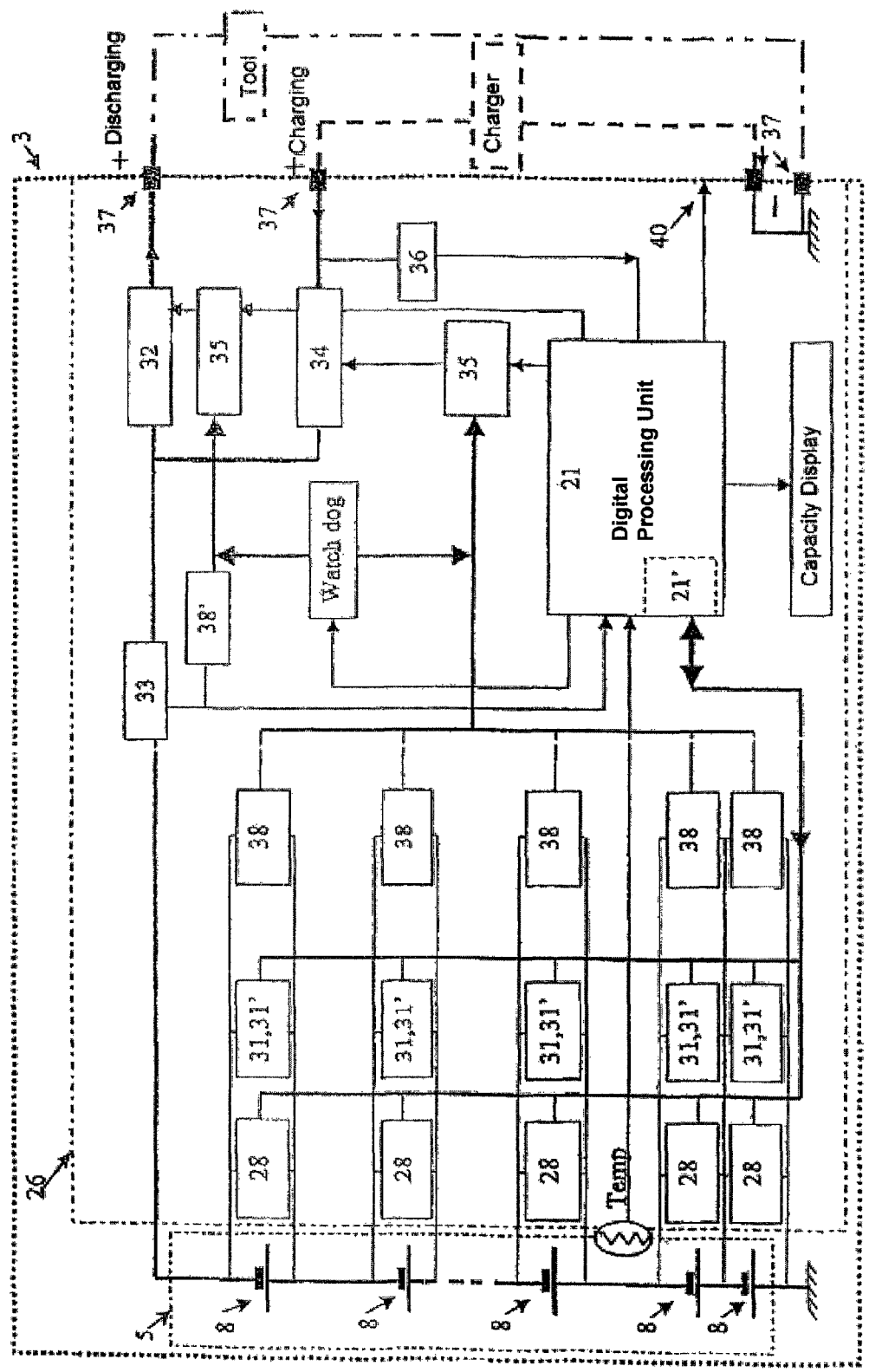
FIG. 10 is a synoptic diagram of the second functional sub-unit that is integral with the tool set.
Figure 11:
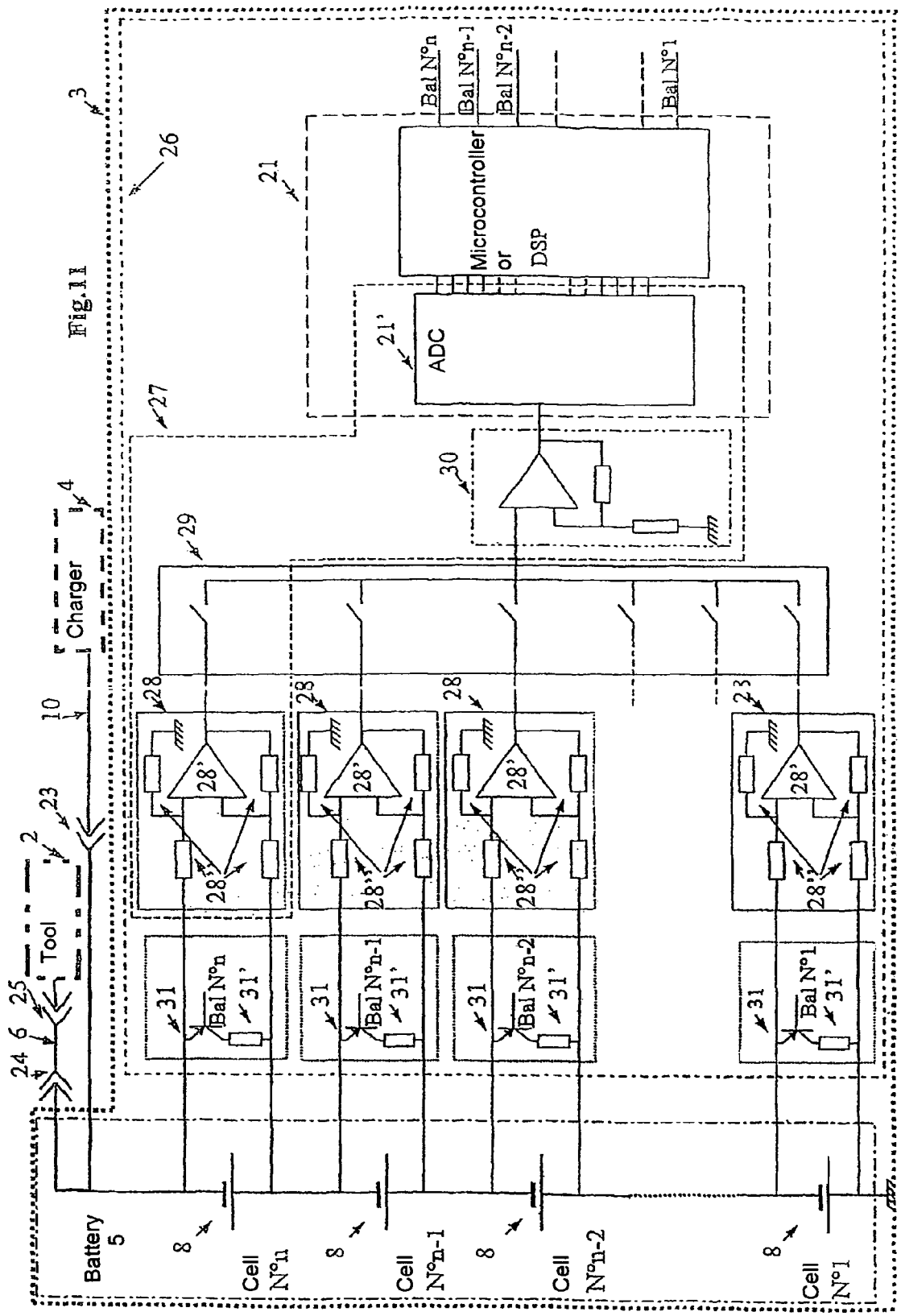
FIG. 11 is an electronic skeleton diagram of some constituent elements of the second sub-unit shown in FIG. 10.

To this end, and as shown in FIGS. 10 and 11, the invention provides that for a battery 5 formed of serially associated n cells 8, the voltage measuring values of each cell 8 are furnished by an acquisition electronic chain 27 (FIG. 11) constituted mainly by identical n analog modules 28 mounted at the terminals of the n cells 8, respectively, of the battery 5 and capable of measuring the voltage of the corresponding cell 8, respectively; the values of the voltages measured by each of the n analog modules 28 being then directed, one after the other, via at least one analog multiplexer 29 and after amplification by an adapted circuit 30, toward an input analog/digital converter 21' of the digital processing unit 21 of the controlling and/or managing module 26.

The converter 21' can be either integrated into the unit 21, or can form a circuit separated from the latter.

By this acquisition electronic chain 27, the control module 26 performs a sequential or cyclical check of the voltages of the various cells 8, causing a high frequency refresh of the voltage data for each cell 8 available in the area of the digital processing unit 21, thus making it possible to quickly take into account and react in the case of an abnormal voltage measuring value.

As shown in FIG. 11, the n analog modules 28 for measuring voltages perform a subtraction for each cell 8, respectively, between the voltage measured at its positive terminal and the voltage measured at its negative terminal, by a differential electronic circuit with operational amplifier 28' using resistances 28" or input resistive elements.

In order to achieve a measuring sensitivity adapted to a reliable and precise control of each cell 8, the differential electronic circuit with operational amplifier 28' of each voltage measuring module 28 comprises resistances or input resistive elements 28" having an impedance close to or greater than 1 Mohm, so as to obtain very low leakage currents which, by way of non-limiting example, are less than 1/20000th per hour of the total capacity of the battery 5, the voltage measuring values of each cell 8 being preferably delivered with a measuring precision of at least 50 mV.

Advantageously, the measuring precision of the desired voltage, i.e., advantageous by at least 50 mV, is obtained by calibration during the manufacture of the electronic board of the control module 26 for controlling and managing the battery 5, making it possible to individually compensate for the errors in voltage measuring module 28.

For each voltage measuring module 28, for example, this calibration can involve programmatically inputting error correcting parameters in the digital processing unit 21, as a function of the measurement of one or several very precise reference voltages which, for this calibration operation, are substituted for the voltages that are normally measured at the terminals of each cell 8.

So that a measuring signal with the requisite precision can be delivered to the voltage measuring module 28, the analog/digital converter 21' will output at least 10 data bits.

According to another characteristic of the invention, the task of balancing the charging of the cells 8 with respect to one another is managed by the digital processing unit 21 which, based on the voltage measuring values of each cell 8, and if necessary for each of them, controls the change in the charging current by dissipating circuits using electronic switchers 31 associated with resistive elements 31'.

The method used to obtain a balanced charging of the battery 5 can be, for example, that described in the commonly owned French Patent No. 2 862 813 filed by the Applicant on Nov. 20, 2003.

According to another characteristic of the invention, the task of managing the discharging involves constantly checking the voltage data of each cell 8 by the digital processing unit 21, interrupting the discharging when the unit detects that one of these voltages of a cell 8 has reached the minimum discharge threshold recommended by the manufacturer of lithium-ion or lithium polymer elements, and cutting off the discharging by deactivating the discharge switching component 32, resulting in the tool of the first sub-unit 2 being stopped and, for example, in a non-limiting manner, by activating a sound or visual warning signal.

As shown in FIGS. 10 and 11, and according to another characteristic of the invention, the tasks of managing the charging, evaluating and displaying the capacity of the battery 5 and of protecting against excess current during the discharging are continuously managed by the digital processing unit 21 due to an analog electronic circuit 33 measuring the charge and discharge current of the battery 5.

Advantageously, during the task of managing the charging, while the third charger sub-unit 4 is connected to the second sub-unit 3 in the area of the electronic board of the control module 26 for controlling and managing the battery 5, charging is ended by opening the charge switching component 34 that is controlled by the digital processing unit 21 when, by the analog electronic circuit 33 measuring the charging and discharging current, said digital processing unit 21 detects a drop of the charging current down to a recommended threshold, for example 50 mA, for the battery 5, on the one hand, or when the temperature of the battery 5 exceeds an authorized limiting value, for example 45° C., or yet when charging during for a period of time that is greater than a given fraction of the theoretical charging time, for example, about 20%.

Furthermore, the task of evaluating and displaying the capacity of the battery 5 is managed by the digital processing unit 21, the latter calculating said capacity by constantly taking into account, during charging and during use of the tool of the first sub-unit 2 the information related to the instantaneous charging and discharging current of the battery 5 delivered by the analog electronic circuit 33 for measuring the charging and discharging current, on the one hand, and the voltage measuring values of each cell 8 and, not necessarily but for a more accurate calculation, their known average internal resistance.

The task of protecting against excess current during discharging of the battery 5 while the tool of the first sub-unit 2 is being used, adapted to preserve the lithium-ion or lithium polymer battery 5 from premature aging or from overheating, involves either cutting off the discharging current in the case of a very substantial pulsed overload of the maximum discharging current allowed for the battery 5, or of an excess of the maximum limiting temperature allowed for the latter, or limiting the discharging current as a function of the energy consumed by the tool of the first sub-unit 2 during a certain sliding time period, knowing that the value of the energy and the sliding time period are experimentally predetermined as a function of the tool, its use and the cycle life desired for the lithium-ion or lithium polymer battery 5 of the second sub-unit 3.

According to a preferred alternative embodiment, the discharging current limitation is managed by the digital processing unit 21 by applying a pulse width modulation (PWM) control, generated either directly by the digital processing unit 21, or by a special component, through a control stage 35, to the discharge switching component 32 made, for example, in the form of an N-channel MOSFET type component.

In order to automatically achieve optimized storage conditions, one can provide that, when the electric tool set 1 is not being charged and has not been used for a given period of time, for example 10 days, the digital processing unit 21 automatically undertakes a storage managing task, which involves verifying whether or not the residual capacity of the battery 5 is greater than the storage capacity recommended by the manufacturers of lithium-ion or lithium polymer elements and, if the residual capacity is indeed greater than the storage capacity, having the digital processing unit 21 initiate an automatic discharge of the battery by resistive circuits 31' connected in parallel on each cell 8, until the storage capacity is reached, and, consequently, stopping all of the electronic circuits while placing the digital processing unit 21 in low consumption stand-by mode, and, if the capacity is below the storage capacity, having the digital processing unit 21 set off a sound and/or visual alarm.

Advantageously, the digital processing unit 21 is capable of detecting the live connection of the third charger sub-unit 4 to the battery 5 by a voltage measurement carried out by the control module 26 at least at one of the terminals 37, preferably a positive terminal, of the second sub-unit 3 that are adapted to be connected to said third charger sub-unit 4.

By detecting the instant when at least one cell 8 has reached the minimum voltage recommended by the manufacturer, this function, possibly carried out by a particular adapted measuring circuit 36, makes it possible to initiate an automatic recharging of the battery 5, as long as the tool is stored in non-use phase.

When the control module 26 detects an excessive or insufficient voltage of the charger 4 in the area of the corresponding connection terminals 37 of the second sub-unit 3, the digital processing unit 21 that uses this information orders the interruption of the charging and sets off a sound and/or visual alarm.

It is noted that the pair of terminals 37 for connecting to the third charger sub-unit 4 and the pair of terminals 37 for connecting to the tool of the first sub-unit 2 have a common negative terminal connected to the ground, but have distinct positive terminal, to each of which a corresponding switching component 32 or 34 is coupled.

To facilitate the long term control of the use of the tool set 1, as well as its maintenance and the planning of its technical follow-up, the task of managing the information and diagnostics can involve storing in the memory of the digital processing unit 21 information that is acquired during use of the tool, such as, for example, the number of recharges, the computation of the number of hours the tool was used, the change in the capacity of the battery 5 in time, the average energy consumed by the tool, or similar information; this information can be transmitted by a wire, radiofrequency, or infrared connection 40 toward a separate operating terminal, such as, for example a personal computer, an electronic personal assistant, or a GSM, which can possibly be connected to the Internet.

To optimize the integration of the device for controlling the tool set 1, the control module 26 for controlling and/or managing the battery 5 of the second sub-unit 3 forming a rechargeable electric energy source can be associated with an electronic module for controlling the actuator 7 and sensors thereof, for example, but in a non-limiting manner, on the same electronic board, using the same digital processing unit 21, if necessary, knowing that the electric actuator 7 of the first sub-unit 2 can be constituted, for example, by a brush direct current electric motor, or by a brushless tri-phase synchronous motor with position sensors, or yet by a brushless tri-phase synchronous motor without position sensors.

Figure 12:
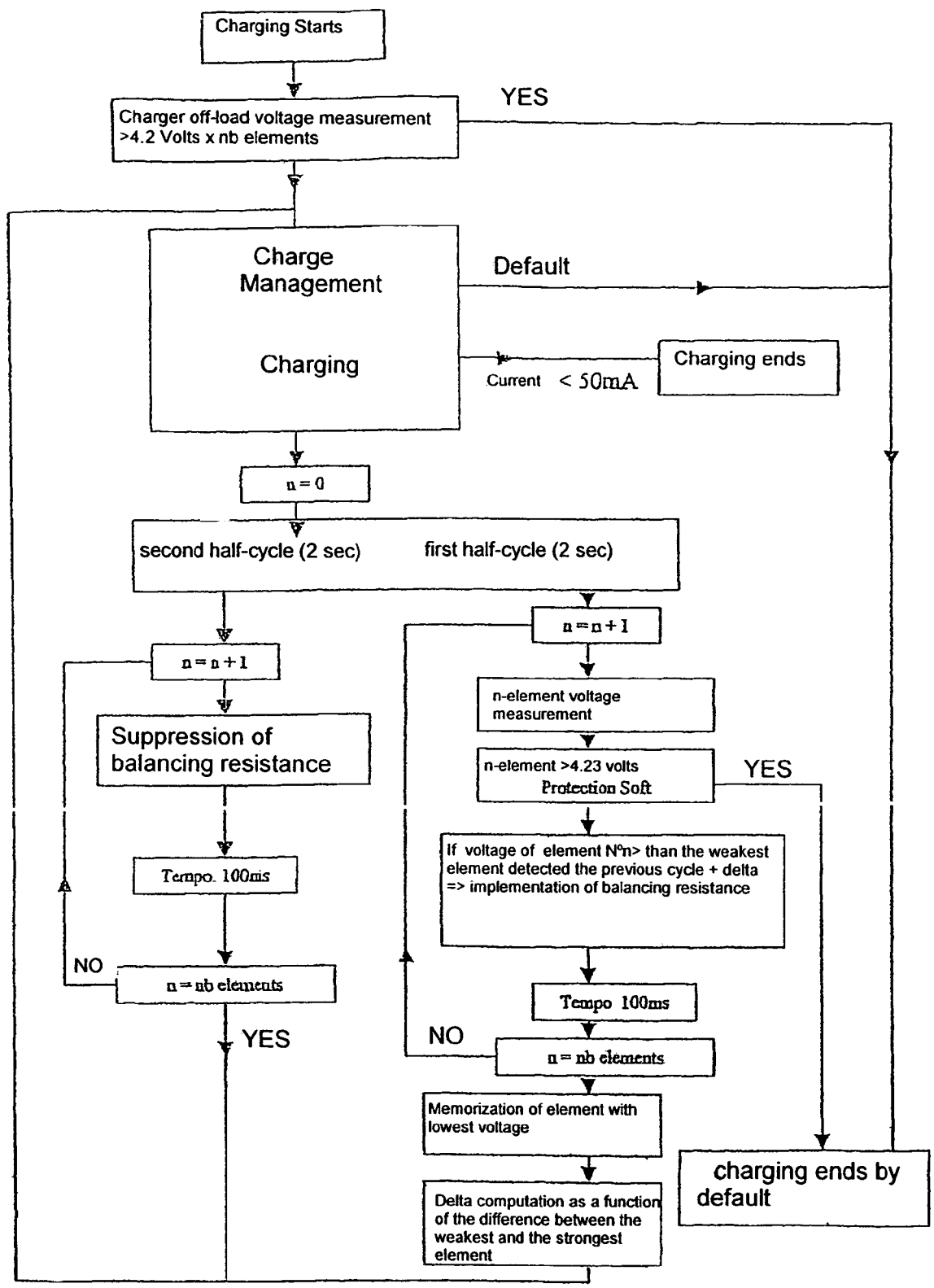
FIG. 12 is the schematic algorithm of one particularly efficient charging method.

The digital processing unit 21 will also include a device for controlling the running of the program for managing the tool set 1 and for the sequenced acquisition of the measuring values, which is symbolically shown in FIG. 12.

In order to provide additional security allowing to protect the cells 8 of the battery 5 when its cells are exposed to extreme voltage or current conditions, additional circuits for interrupting the connection of the second sub-unit 3 with the first or third sub-unit 2 or 4 can be provided, in parallel to the aforementioned normal controlling system constructed around the digital processing unit 21.

Thus, the control module 26 for controlling the battery 5 can comprise for each cell 8, redundant safety circuits 38 for stopping the charging, each of them being capable of individually controlling the general interruption of the charging, in the case of excess voltage in a cell 8, by directly deactivating the charge switching component 34 without biasing the digital processing unit 21.

Similarly, the control module 26 can comprise a discharge stopping redundant circuit 38' (FIG. 10) that is capable of ordering the interruption of the discharging if the measuring analog electronic circuit 33 detects a discharge current equal to or greater than a maximum value allowed for the battery 5, by directly deactivating the discharge switching component 32 without biasing the digital processing unit 21.

Preferably, the third charger sub-unit 4 adapted to recharging the lithium-ion or lithium polymer battery 5 generates a voltage with a precision approximating 0.5% and a controlled current, both obtained by a special circuit for regulating voltage and current. Such circuits are already known and do not need to be described any further.

As shown in FIGS. 1 and 2, each functional sub-unit 2, 3, and 4 is mounted (when the sub-units 3 and 4 are distinct) in a specific protective and/or gripping casing, which can be connected to one another in pair by disconnectable flexible cables 6, 10 for transferring energy and transmitting the command and/or control signals between said sub-units 2, 3 and 4.

It is noted that the charging of the battery may or may not be carried out with the cable 6 connecting the sub-units 2 and 3 to each other.

The casing enclosing the first sub-unit 2 also carries the tool and is ergonomically configured, at least in the area of one portion, so as to enable an easy, reliable, and comfortable grip by the user.

Furthermore, the analog control buttons or members, as well as the sound and/or light display and warning devices are preferably present, partially in the area of the casing of the first sub-unit 2 and partially in the area of the casing of the second sub-unit 3, as a function of their type and of the necessity for them to be accessible to the operator during actual use of the tool set 1.

Naturally, the invention is not limited to the embodiment described and shown in the annexed drawings. Modifications remain possible, in particular with respect to the constitution of the various elements, or by substitution of technical equivalents, without leaving the scope of protection of the invention.

The invention claimed is:

1. A power autonomous portable electric tool set, comprising:
    a first sub-unit generating a mechanical operation of a tool comprising an electric actuator;
    a portable second sub-unit forming an electric energy source of the set comprising a battery and at least one electric or electronic module located in a vicinity of the battery for at least one of controlling and managing the battery;
    a third charger sub-unit for electrically recharging the battery comprising at least one electric supply source, wherein the third charger sub-unit adapts a voltage and a current of the at least one electric supply source to recharge the battery; and
    a cutoff device structured and arranged to cutoff an electric supply of the electric actuator,
    wherein the first sub-unit is electrically disconnectably connectable to the second sub-unit,
    wherein the third sub-unit is electrically disconnectably connectable to the second sub-unit,
    wherein the battery comprises one of a rechargeable electrochemical lithium-ion or rechargeable electrochemical lithium polymer battery,
    wherein at least one of the at least one electric or electronic module and the cutoff device are operable to prevent overcharging of the battery during a charging phase,
    wherein the at least one of the at least one electric or electronic module and the cutoff device are operable to prevent over-discharging of the battery during operation of the tool,
    wherein the at least one of the at least one electric or electronic module and the cutoff device are operable to protect the battery against excess current during a discharging phase,
    wherein the at least one of the at least one electric or electronic module and the cutoff device are operable to interrupt the discharging phase to turn off the tool, when at least one cell of the battery reaches a threshold minimum voltage recommended by a manufacturer of the battery, and
    wherein the protecting against excess current protects the battery from premature aging or from overheating during a discharging of the battery during use of the tool and comprises:
        the at least one of the at least one electric or electronic module and the cutoff device cutting off a discharging current in a case of at least one of a very substantial pulsed overload of a maximum discharging current allowed for the battery and an excess of a maximum temperature allowed for the battery; and limiting the discharging current as a function of an energy consumed by the tool during a certain sliding time period.

2. The electric tool set according to claim 1, wherein the battery is formed by an association of a series of cells, each cell comprising one of one element and a plurality of associated parallel elements.

3. The electric tool set according to claim 1, further comprising a first flexible disconnectable electrical cord, wherein the first sub-unit is electrically disconnectably connectable to the second sub-unit by the first flexible disconnectable electrical cord.

4. The electric tool set according to claim 1, further comprising a second flexible disconnectable electrical cord, wherein the third sub-unit is electrically disconnectably connectable to the second sub-unit by the second flexible disconnectable electrical cord.

5. The electric tool set according to claim 1, wherein the cutoff device is structured and arranged to cutoff an electric power supply of the electric actuator at least one of automatically and manually.

6. The electric tool set according to claim 1, wherein the cutoff device is structured and arranged to cutoff an electric power supply of the electric actuator when the battery reaches a voltage threshold harmful to its functioning.

7. The electric tool set according to claim 1, wherein the tool is one of pruning scissors, a saw, a fruit picking tool, a lawnmower, a bush cutter, a hedge cutter, an impact spanner and a pneumatic hammer.

8. The electric tool set according to claim 3, wherein the first flexible disconnectable electrical cord comprises a first connector couplable to the first sub-unit.

9. The electric tool set according to claim 3, wherein the first flexible disconnectable electrical cord comprises a second connector couplable to the second sub-unit.

10. The electric tool set according to claim 3, the first flexible disconnectable electrical cord comprises a first connector couplable to the first sub-unit and a second connector couplable to the second sub-unit.

11. The electric tool set according to claim 1, wherein the first sub-unit includes the cutoff device for automatically cutting off an electric supply of the first sub-unit when a battery voltage of the battery has reached a minimum low level prior to a deterioration, characterized by a significant loss of battery capacity and an increase of battery spontaneous discharge.

12. The electric tool set according to claim 1, wherein one module of the at least one electric or electronic modules includes the cutoff device to automatically cut off an electric supply of the first sub-unit when a voltage of battery has reached a minimum low level prior to a deterioration of the battery, characterized by significant loss of battery capacity and increase of battery spontaneous discharge.

13. The electric tool set according to claim 1, wherein one module of the at least one electric or electronic modules includes the cutoff device to automatically cut off the electric charge of the battery when a voltage delivered by the third charger sub-unit has reached a maximum value prior to a deterioration of the battery, characterized by significant loss of battery capacity and increase of battery spontaneous discharge.

14. The electric tool set according to claim 1, wherein one module of the at least one electric or electronic modules includes the cutoff device to automatically cut off an electric charging of the battery when a charging current for the battery has reached a minimum low level recommended or required by the manufacturer of the battery.

15. The electric tool set according to claim 1, wherein one module of the at least one electric or electronic modules protects the battery against short circuits.

16. The electric tool set according to claim 15, wherein the one module of the at least one electric or electronic modules comprises a fuse arranged at least at one of the terminals of the battery to protect the battery against the short circuits.

17. The electric tool set according to claim 15, wherein the one module of the at least one electric or electronic modules comprises a circuit breaker arranged at least at one of the terminals of the battery to protect the battery against the short circuits.

18. The electric tool set according to claim 1, wherein, during a period of non-use of the first sub-unit, one module of the at least one electric or electronic modules places the battery in one of a no-consumption mode and a very-low-consumption mode.

19. The electric tool set according to claim 18, wherein the one module of the at least one electric or electronic modules comprises a switch arranged at one of the terminals of the battery to place the battery in one of the no-consumption mode and the very-low-consumption mode.

20. The electric tool set according to claim 19, wherein the one module of the at least one electric or electronic modules further comprises one of a fuse and a circuit breaker arranged at least at one of the terminals of the battery, wherein the switch is arranged after the one of the fuse and the circuit breaker.

21. The electric tool set according to claim 1, wherein the third charger sub-unit includes the cutoff device to automatically cut off an electric charging of the battery when a voltage of the battery has reached a maximum high level prior to a degradation of the battery.

22. The electric tool set according to claim 1, wherein the third charger sub-unit includes the cutoff device to automatically cut off an electric charging of the second sub-unit when a charging current to the battery has reached a minimum low level recommended or required by a manufacturer of the battery.

23. The electric tool set according to claim 1, wherein elements of battery of the second sub-unit are in a commercial 18650 size.

24. The electric tool set according to claim 1, wherein the at least one electric or electronic module comprises a single control module composed of at least one electronic board with at least one digital processing unit associated with a memory and at least one of annexed digital circuits and analog circuits.

25. The electric tool set according to claim 24, wherein the at least one digital processing unit comprises at least one of a microprocessor, a microcontroller, and a digital signal processor.

26. The electric tool set according to claim 1, wherein the battery comprises an association of a series of cells, and wherein the at least one electric or electronic module at least one of manages a charging, manages a discharging, balances a charging of each cell of the battery, evaluates and displays a capacity of the battery, protects the battery during a discharging against excess current when the tool is being used, manages the tool during storing phases, manages alarms, manages information, transmits information collected, and manages diagnostics.

27. The electric tool set according to claim 26, wherein the at least one electric or electronic module is structured and arranged to constantly exploit voltage measuring values of each cell of the battery in performing at least one of the managing of the charging, the managing of the discharging, the balancing of the charging of each cell, and the evaluating and the displaying of the capacity of the battery.

28. The electric tool set according to claim 1, wherein the battery further comprises n serially associated cells and the at least one electric or electronic module comprises a digital processing unit having an input analog/digital converter, and the electric tool set further comprises:
an acquisition electronic chain comprising identical n analog modules mounted at terminals of the n cells to measure voltage values for each cell;
at least one analog multiplexer; and
an adapted circuit,
wherein the voltage values measured by the n analog modules are directed, one after the other, by the at least one analog multiplexer toward the input analog/digital converter after amplification by the adapted circuit.

29. The electric tool set according to claim 28, further comprising a differential electronic circuit with an operational amplifier, using one of resistances and input resistive elements, being arranged to subtract a voltage measured at a negative terminal of a cell from a voltage measurement of a positive terminal of the cell.

30. The electric tool set according to claim 29, wherein the one of resistances and input resistive elements have an impedance greater than or about 1 Mohm, to obtain very low leakage currents.

31. The electric tool set according to claim 30, wherein the leakage currents are less than $1/20000^{th}$ per hour of a total capacity of the battery.

32. The electric tool set according to claim 28, wherein the voltage measuring values of each cell are delivered with a measuring precision of at least 50 mV.

33. The electric tool set according to claim 32, wherein the measuring precision of at least 50 mV is obtained by calibration during a manufacture of an electronic board of the at least one electric or electronic module.

34. The electric tool set according to claim 33, wherein the calibration includes:
substituting at least one very precise reference voltage for the measured voltages at the terminals of each cell; and
programmatically inputting error correcting parameters in the digital processing unit, for each voltage measuring module, as a function of a measurement of the at least one very precise reference voltage.

35. The electric tool set according to claim 28, further comprising dissipating circuits including electronic switchers associated with resistive elements, wherein a balancing of the charging of the cells with respect to one another is managed by the digital processing unit controlling a change in a charging current with the dissipating circuits.

36. The electric tool set according to claim 28, further comprising:
a discharge switching component; and
a sound or visual warning signal,
wherein managing a discharging comprises:
constantly checking voltage measuring values of each cell by the digital processing unit;
interrupting the discharging when the digital processing unit detects that one of the voltages measuring values of a cell has reached a minimum discharge threshold recommended by the manufacturer of the battery; and
cutting off the discharging by deactivating the discharge switching component, resulting in the tool being stopped, and by activating the sound or visual warning signal.

37. The electric tool set according to claim 28, further comprising an analog electronic circuit, which measures a charging and discharging current of the battery, wherein managing a charging, evaluating and displaying a capacity of the battery and protecting against excess current during a discharging are continuously managed by the digital processing unit in conjunction with the analog electronic circuit.

38. The electric tool set according to claim 37, further comprising a charge switching component controlled by the digital processing unit, wherein, while the third charger sub-unit is connected to the second sub-unit in an area of an electronic board of the electric or electronic module controlling the battery, during the managing of the charging, an end of the charging is obtained by opening the charge switching component when, by the analog electronic circuit measuring the charging and discharging current, the digital processing unit at least one of:
detects a drop in the charging current for the battery down to a recommended threshold,
detects a temperature of the battery exceeding an authorized limiting value; and
detects the charging continuing for a period of time that is greater than a given fraction of a theoretical charge time.

39. The electric tool set according to claim 38, wherein the recommended threshold is about 50 mA.

40. The electric tool set according to claim 38, wherein the authorized limiting value is about 45° C.

41. The electric tool set according to claim 38, wherein the given fraction of the theoretical charge time is about 20%.

42. The electric tool set according to claim 38, wherein the digital processing unit manages the evaluating and the displaying the capacity of the battery during the charging and during use of the tool by calculating the capacity by constantly accounting for capacity information related to:
an instantaneous charging and discharging current of the battery determined by the analog electronic circuit; and
the voltage measuring values of each cell.

43. The electric tool set according to claim 42, wherein the capacity information is further related to an average internal resistance of each cell.

44. The electric tool set according to claim 26, further comprising:
a digital processing unit memory;
a separate operating terminal; and
at least one of a wire connection, a radio frequency connection, and an infrared connection to the separate operating terminal,
wherein the managing of information and the managing of diagnostics comprises storing information acquired during use of the tool in the digital processing unit memory, the information being transmittable by the at least one of the wire connection, the radiofrequency connection, and the infrared connection to the separate operating terminal.

45. The electric tool set according to claim 44, wherein the information acquired includes at least one of a number of recharges, a computation of a number of hours the tool was used, a change in the capacity of the battery in time, and an average energy consumed by the tool.

46. The electric tool set according to claim 44, wherein the separate operating terminal is at least one of a personal computer, an electronic personal assistant, and a GSM.

47. The electric tool set according to claim 44, wherein the separate operating terminal is connectable to the Internet.

48. The electric tool set according to claim 24, wherein the first sub-unit further comprises an electric actuator module for controlling the electric actuator, and wherein the control module is associated with the electric actuator module on the electronic board, with both the control module and the electric actuator module using a same digital processing unit of the at least one digital processing unit.

49. The electric tool set according to claim 28, further comprising a charge switching component,
wherein the at least one electric or electronic module further comprises a control module, which comprises, for each cell, safety redundant circuits for stopping a charging, and
wherein, in a case of a voltage overload of a cell, each safety redundant circuit is individually capable of controlling a general interruption of the charging by directly deactivating the charge switching component without biasing the at least one digital processing unit.

50. The electric tool set according to claim 37, wherein the control module further comprises a discharge stopping redundant circuit,
wherein if the analog electronic circuit detects a discharging current equal to or greater than a maximum value allowed for the battery, the discharge stopping redundant circuit interrupts the discharging by directly deactivating the discharge switching component without biasing the digital processing unit.

51. The electric tool set according to claim 1, wherein the third charger sub-unit further comprises a special circuit for regulating voltage and current, wherein the special circuit generates a voltage with a precision approximating 0.5% and a controlled current.

52. The electric tool set according to claim 1, further comprising at least one of specific protective casings and specific gripping casings for each of the first sub-unit, second sub-unit and third charging sub-unit, in which each of the first sub-unit, second sub-unit and third charging sub-units are respectively mounted.

53. A power autonomous portable electric tool set, comprising:
a first sub-unit generating a mechanical operation of a tool comprising an electric actuator;
a portable second sub-unit forming an electric energy source of the set comprising a battery and at least one electric or electronic module located in a vicinity of the battery for at least one of controlling and managing the battery;
a third charger sub-unit for electrically recharging the battery comprising at least one electric supply source, wherein the third charger sub-unit adapts a voltage and a current of the at least one electric supply source to recharge the battery; and
a cutoff device structured and arranged to cutoff an electric supply of the electric actuator,
wherein the first sub-unit is electrically disconnectably connectable to the second sub-unit,
wherein the third sub-unit is electrically disconnectably connectable to the second sub-unit,
wherein the battery comprises one of a rechargeable electrochemical lithium-ion or rechargeable electrochemical lithium polymer battery,
wherein at least one of the at least one electric or electronic module and the cutoff device are operable to prevent overcharging of the battery during a charging phase, and
wherein the at least one of the at least one electric or electronic module and the cutoff device are operable to prevent over-discharging of the battery during operation of the tool,
wherein the battery further comprises n serially associated cells and the at least one electric or electronic module comprises a digital processing unit having an input analog/digital converter, and the electric tool set further comprises:
an acquisition electronic chain comprising identical n analog modules mounted at terminals of the n cells to measure voltage values for each cell;
at least one analog multiplexer; and
an adapted circuit,
wherein the voltage values measured by the n analog modules are directed, one after the other, by the at least one analog multiplexer toward the input analog/digital converter after amplification by the adapted circuit,
further comprising an analog electronic circuit, which measures a charging and discharging current of the battery, wherein managing a charging, evaluating and displaying a capacity of the battery and protecting against excess current during a discharging are continuously managed by the digital processing unit in conjunction with the analog electronic circuit,
wherein the protecting against excess current protects the battery from premature aging or from overheating during a discharging of the battery during use of the tool and comprises:
cutting off a discharging current in a case of at least one of a very substantial pulsed overload of a maximum discharging current allowed for the battery and an excess of a maximum temperature allowed for the battery; and
limiting the discharging current as a function of an energy consumed by the tool during a certain sliding time period,
wherein the values of the energy and the sliding time period are experimentally predetermined as a function of the tool, the tool's use and a cycle life desired for the battery.

54. The electric tool set according to claim 53, further comprising:
a control stage; and
a discharge switching component,
wherein limiting the discharging current is managed by the at least one digital processing unit by applying a pulse width modulation (PWM) control, generated one of directly by the at least one digital processing unit and by a special component, through the control stage, to the discharge switching component.

55. The electric tool set according to claim 54, wherein the discharge switching component comprises an N-channel MOSFET type component.

56. A power autonomous portable electric tool set, comprising:
a first sub-unit generating a mechanical operation of a tool comprising an electric actuator;
a portable second sub-unit forming an electric energy source of the set comprising a battery and at least one electric or electronic module located in a vicinity of the battery for at least one of controlling and managing the battery;
a third charger sub-unit for electrically recharging the battery comprising at least one electric supply source, wherein the third charger sub-unit adapts a voltage and a current of the at least one electric supply source to recharge the battery; and a cutoff device structured and arranged to cutoff an electric supply of the electric actuator, wherein the first sub-unit is electrically disconnectably connectable to the second sub-unit, wherein the third sub-unit is electrically disconnectably connectable to the second sub-unit, wherein the battery comprises one of a rechargeable electrochemical lithium-ion or rechargeable electrochemical lithium polymer battery, wherein at least one of the at least one electric or electronic module and the cutoff device are operable to prevent overcharging of the battery during a charging phase, and wherein the at least one of the at least one electric or electronic module and the cutoff device are operable to prevent over-discharging of the battery during operation of the tool, and wherein the battery comprises an association of a series of cells, and wherein the at least one electric or electronic module at least one of manages a charging, manages a discharging, balances a charging of each cell of the battery, evaluates and displays a capacity of the battery, protects the battery during a discharging against excess current when the tool is being used, manages the tool during storing phases, manages alarms, manages information, transmits information collected, and manages diagnostics, the electric tool set further comprising resistive circuits connected in parallel on each cell, wherein the at least one digital processing unit automatically undertakes a storage managing task when the electric tool set is not being charged and has not been used for a given period of time, the storage managing task comprising:

verifying whether or not a residual capacity of the battery is greater than a storage capacity recommended by a manufacturer of the battery;

if the residual capacity is greater than the storage capacity, the at least one digital processing unit initiating an automatic discharging of the battery by the resistive circuits, until the storage capacity is reached, and stopping all electronic circuits while placing the at least one digital processing unit in low consumption stand-by mode; and if the residual capacity is below the storage capacity, the at least one digital processing unit setting off at least one of a sound alarm and a visual alarm.

57. The electric tool set according to claim 56, wherein the given period of time is 10 days.

58. A power autonomous portable electric tool set, comprising:

a first sub-unit generating a mechanical operation of a tool comprising an electric actuator;

a portable second sub-unit forming an electric energy source of the set comprising a battery and at least one electric or electronic module located in a vicinity of the battery for at least one of controlling and managing the battery;

a third charger sub-unit for electrically recharging the battery comprising at least one electric supply source, wherein the third charger sub-unit adapts a voltage and a current of the at least one electric supply source to recharge the battery; and a cutoff device structured and arranged to cutoff an electric supply of the electric actuator, wherein the first sub-unit is electrically disconnectably connectable to the second sub-unit, wherein the third sub-unit is electrically disconnectably connectable to the second sub-unit, wherein the battery comprises one of a rechargeable electrochemical lithium-ion or rechargeable electrochemical lithium polymer battery, wherein at least one of the at least one electric or electronic module and the cutoff device are operable to prevent overcharging of the battery during a charging phase, and wherein the at least one of the at least one electric or electronic module and the cutoff device are operable to prevent over-discharging of the battery during operation of the tool, wherein the at least one electric or electronic module comprises a single control module composed of at least one electronic board with at least one digital processing unit associated with a memory and at least one of annexed digital circuits and analog circuits, wherein the second sub-unit further comprises connection terminals, and wherein the at least one digital processing unit detects a live connection of the third charger sub-unit to the battery of the second sub-unit by a voltage measurement by the control module at least at one of the connection terminals.

59. The electric tool set according to claim 58, further comprising a particular adapted measuring circuit, wherein the detecting the live connection is carried out by the particular adapted measuring circuit, facilitating initiation of an automatic recharging of the battery while the tool is stored in a non-use phase, by detecting an instant when at least one cell has reached a minimum voltage recommended by a manufacturer.

60. The electric tool set according to claim 58, wherein when the control module detects an excessive or insufficient voltage of the third charger sub-unit in an area of the connection terminals, the digital processing unit interrupts a charging and sets off at least one of a sound alarm and a visual alarm.

* * * * *